United States Patent [19]

Anderegg et al.

[11] 4,164,649
[45] Aug. 14, 1979

[54] METHOD AND APPARATUS FOR SHEET TRANSPORT IN AUTOMATIC READING EQUIPMENT

[75] Inventors: Max Anderegg; Kurt Rütimann, both of Forch, Switzerland

[73] Assignee: Feller AG, Horgen, Switzerland

[21] Appl. No.: 929,409

[22] Filed: Jul. 31, 1978

[30] Foreign Application Priority Data

Jul. 29, 1977 [DE] Fed. Rep. of Germany ....... 2734371

[51] Int. Cl.² .................. G06K 13/12; B65H 5/22; B07C 5/34
[52] U.S. Cl. .................. 235/480; 209/583; 271/4
[58] Field of Search .............. 235/475, 476, 477, 480; 271/4, 64; 209/554, 569, 583, 534

[56] References Cited

U.S. PATENT DOCUMENTS

| | | | |
|---|---|---|---|
| 3,573,437 | 4/1971 | Scuitto et al. | 235/477 |
| 3,624,360 | 11/1971 | Collier et al. | 235/477 |
| 3,874,650 | 4/1975 | Steigerwald et al. | 235/475 |
| 4,035,614 | 7/1977 | Frattarola et al. | 235/477 |

*Primary Examiner*—Daryl W. Cook
*Attorney, Agent, or Firm*—Weiser, Stapler & Spivak

[57] ABSTRACT

After having been read, individual sheets are initially introduced only partially into a first collection space for successfully read sheets. These partially introduced sheets are then introduced completely into said first collection space upon occurrence of a "go" decision from the reading. In contrast, upon occurrence of a "no go" decision, the partially introduced sheets are again withdrawn from the first collection space for successfully read sheets by an oppositely directed movement and are supplied to a separate second collection space for unsuccessfully read sheets. Also the apparatus for carrying out the foregoing.

5 Claims, 3 Drawing Figures

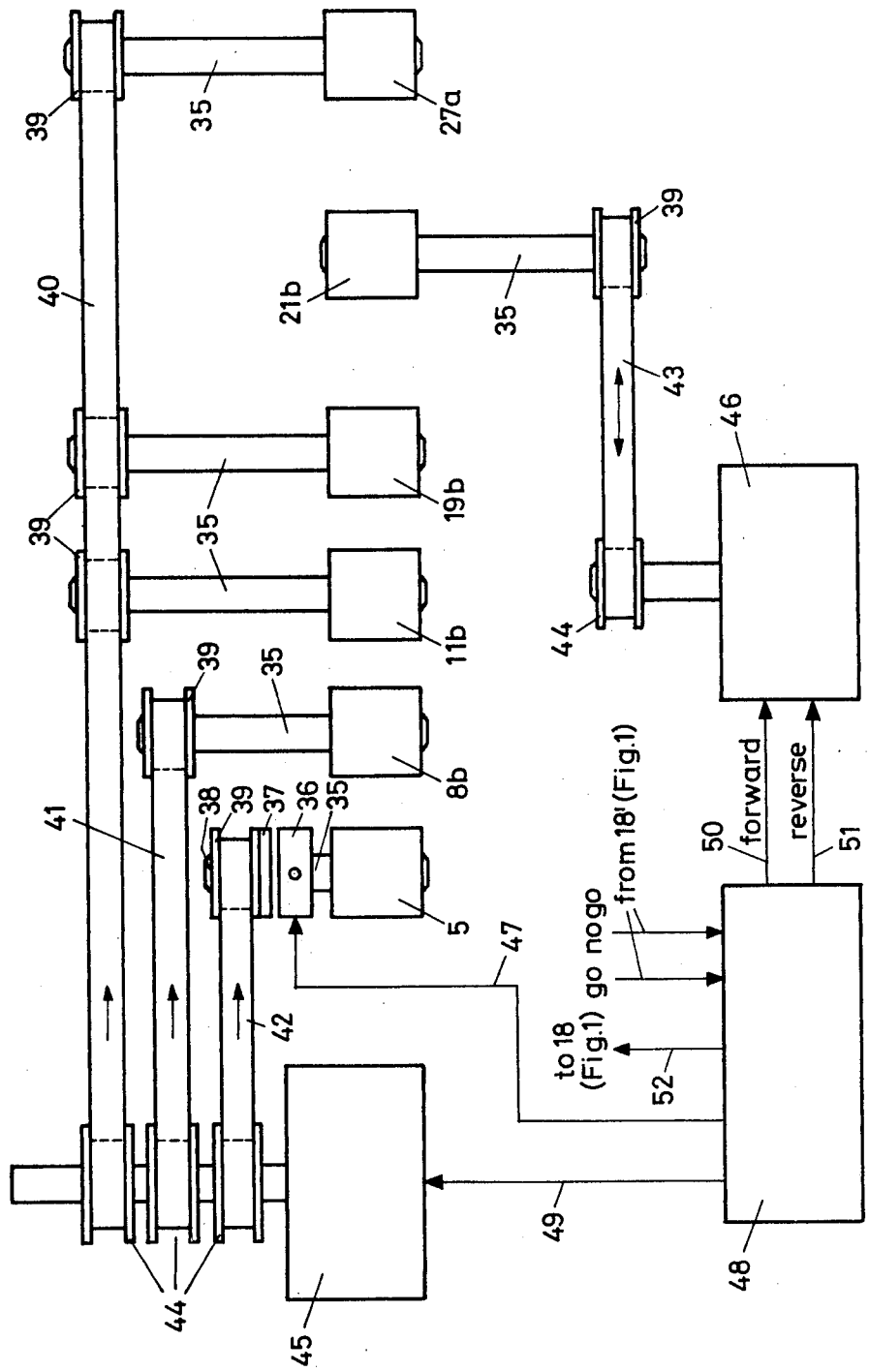

METHOD AND APPARATUS FOR SHEET TRANSPORT IN AUTOMATIC READING EQUIPMENT

This invention relates to a method of sheet transport in automatic reading equipment. The equipment is characterized by the fact that the individual sheets to be read are removed from a stack, are transported to a reading position, and are subsequently transported away from that position. In addition, the invention relates to apparatus for practicing the method.

Automatic reading equipments are known, which serve to automatically read the data present upon a single sheet or upon a series of loose or interconnected sheets. In these the output of the reading may be supplied to electronic data processing apparatus.

In such reading equipment a whole stack of sheets to be processed may, for example, be read in series, i.e. page by page. To that end, the individual sheets must be transported to a reading equipment and must further be transported away from it. In practice it is inevitable that the reading will not take place perfectly for individual sheets. Consequently, it is necessary:
 a. to identify sheets which have not been successfully read;
 b. to segregate and if desired also collect the unsuccessfully read sheets;
 c. to again read the segregated sheets, or
 d. to individually process the segregated sheets in some other manner;
 e. to also deposit the sheets in the same sequence as at the beginning.

Optical reading equipment of the type described should, for practical reasons, have the smallest possible dimensions, be of relatively simple construction, exhibit as simple as possible a mechanism requiring only low power, and further be easy to service. Known equipments for the stated purpose fulfill these requirements to an inadequate extent. In particular their sheet transport arrangements have large dimensions and this makes it more difficult to build compact reading equipments. Apparatuses for identifying successful reading are known, in themselves.

Accordingly, it is an object of the present invention to provide a method of sheet transport for automatic reading equipment and apparatus for the practice of that method, which collects sheets that have been segregated based on a "go" or "no go" decision for successfully or unsuccessfully read sheets, and which does not require additional storage space for the read pages during the period of decision as to the reading result.

This and other objects which will appear are achieved in accordance with the invention by a method in which a sheet transported away from the reading position is initially introduced partially into a collection space for successfully read sheets. After occurrence of a "go" decision for the reading, the partially introduced sheet is then transported all the way into the collection space. On the other hand, upon the occurrence of a "no go" decision, the sheet is extracted by means of an oppositely directed movement from the collection space for the successfully read sheets and is transported to a separate collection space for unsuccessfully read sheets.

The present invention also relates to an apparatus for the practice of the method described above.

By virtue of the fact that the sheets are initially introduced only partially into the first collection space and are displaced retrograde as in a reversal point upon occurrence of a "no go" decision for the reading, whereby they become subject to being transported to the second collection space, there is achieved an extremely compact apparatus for sheet transport, requiring little space.

Because only one transport roller pair needs to be reversible as to its direction of rotation, there is also feasible a very simple mechanical drive mechanism.

In what follows, an illustrative example of the invention is described with reference to the accompanying drawings wherein FIG. 1 is a schematic illustration of an illustrative embodiment;

FIG. 3 is a diagrammatic illustration of the drive and control apparatus.

Figure 1:
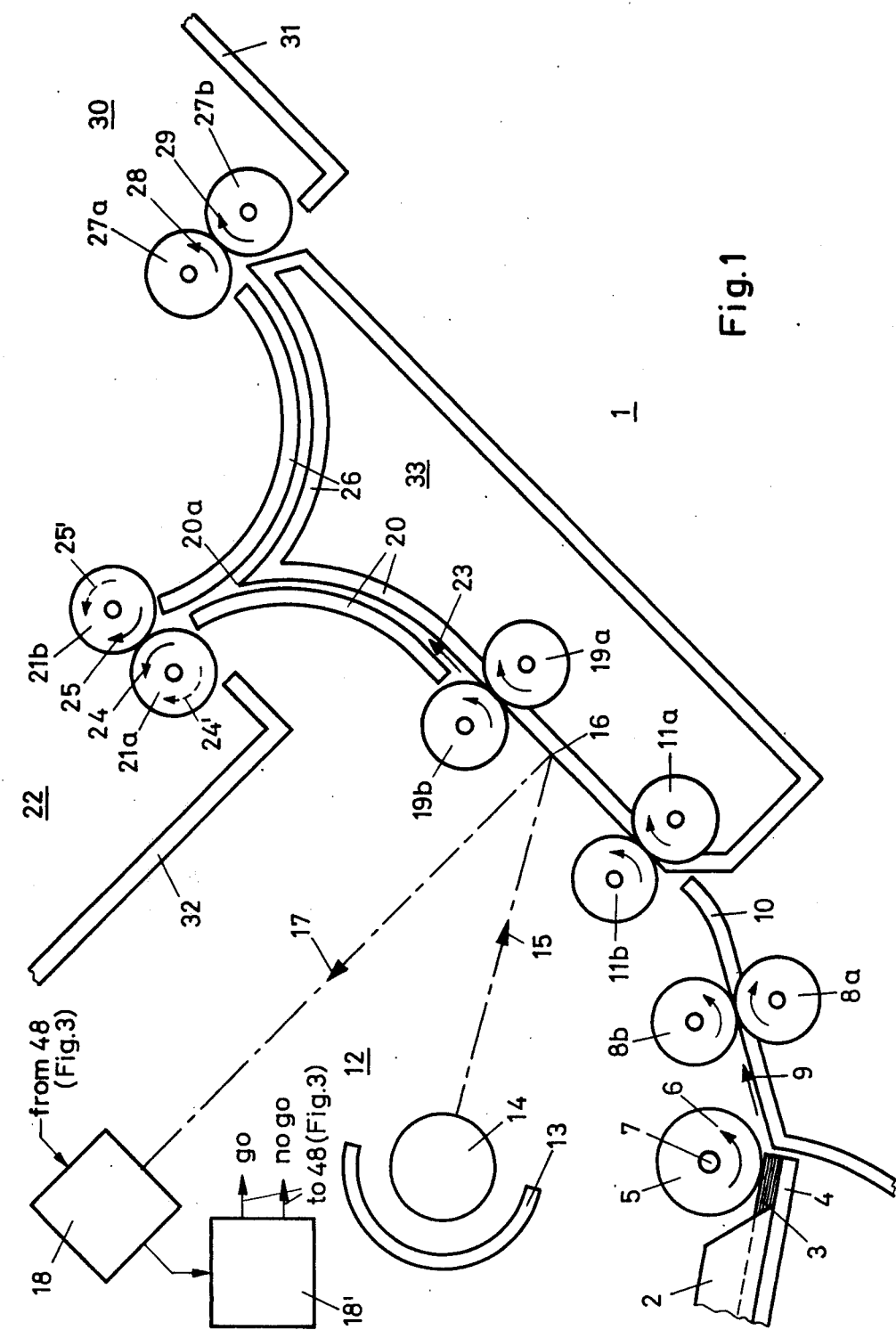

In FIG. 1 there is shown a reading equipment 1 which includes an apparatus 33 for sheet transporting in accordance with the present invention. A container 2 is adapted to receive a stack 3 of sheets to be read. A guide plate 4 leads the sheets to be read into the operating region of a stripping roller 5 which is set into rotary motion about its axis 7 in the direction of arrow 6 periodically by means of a drive mechanism which is discussed later herein. By so doing, the stripper roller 5 pulls sheet after sheet off stack 3 and transports the sheets in succession to a first transport roller pair 8a, 8b, which is also periodically actuated in the direction of arrow 9 by a drive mechanism not illustrated in FIG. 1.

A sheet to be read removed from stack 3 is transported by means of the first transport roller pair 8a, 8b via a first sheet guide 10 to an input transport roller pair 11a, 11b of a reading apparatus 12. This reading apparatus is of known construction and is therefore shown in the drawing only partially, or rather schematically. The reading apparatus 12 includes a light source 14 equipped with reflector 13, e.g. a sodium bulb, which brightly illuminates a reading location 16 in the direction of arrow 15.

By means of input transport rollers 11a, 11b the sheet to be read is propelled through reading position 16. From the illuminated portion of the sheet to be read a schematically represented light beam 17 falls upon a photoelectric receiving means 18 also indicated only schematically. The photoelectric receiving means 18 produces in known manner electrical signals, which represent information read off the sheet being led past. These signals may be supplied in known manner to a utilization means 18' connected to the output of the receiving means 18.

Both the input transport roller pair 11a, 11b and an output transport roller pair 19a, 19b are actuated by a drive mechanism discussed later herein with reference to FIG. 3 and transport the sheet after reading through a sheet guide 20 to an additional transport roller pair 21a, 21b. This additional transport roller pair 21a, 21b is positioned at the inlet to a collection space 22 for successfully read sheets.

The previously described transport roller pairs 8a, 8b and 11a, 11b and 19a, 19b are always caused to rotate in the same direction indicated by arrows, so that a sheet removed by stripper roller 5 ultimately is supplied in the direction of arrows 9 and 23 to the additional transport roller pair 21a, 21b. In contrast, the additional transport roller pair 21a, 21b has a drive (not illustrated in FIG. 1) which is reversible with respect to its direction of rotation (see FIG. 3). The direction of rotation of this reversible drive, and therefore of the rollers of the additional transport roller pair 21a, 21b, is controlled by a control means (see FIG. 3), which is so constructed that it causes rotation for a predetermined period of time in one direction or the other for additional transport roller pair 21a, 21b depending upon the receipt from the utilization means 18' of a "go" or "no go" decision as a result of the reading.

The arrangement is such that, during the reading process, which takes place at reading location 16, the sheet to be read continues to be advanced in the direction of arrow 23, is taken over by the additional transport roller pair 21a, 21b and is substantially but not completely introduced into collection space 22. Only if and when the utilization means 18' provides a "go" decision regarding the reading which has taken place is the additional transport roller pair 21a, 21b further actuated in the direction of rotation indicated by arrows 24 and 25, whereby the successfully read sheet which is still clamped between the rollers of transport roller pair 21a and 21b is finally introduced into the collection space 22 for successfully read sheets.

On the other hand, if the reading of a particular sheet at reading position 16 is determined to have been unsuccessful, then while this sheet already protrudes into the collection space 22 but is still firmly clamped between the rollers of the additional transport roller pair 21a, 21b, the utilization means 18' which is connected to the output of the photoelectric receiving means 18 produces a "no go" decision signal. This signal is supplied as control signal to the drive mechanism of the additional transport roller pair 21a, 21b in order to produce temporary reversal of their direction of rotation, that is in the direction indicated by arrows 24' and 25'.

Due to the now-reversed direction of rotation of the additional transport roller pair 21a, 21b, the sheet which already protrudes into collection space 22 is withdrawn from that collection space and in so doing is introduced into additional sheet guide 26. This sheet therefore traverses a reversal point. The additional sheet guide 26 leads the unsuccessfully read sheet to a final transport roller pair 27a, 27b.

The final transport roller pair 27a, 27b is either set into motion temporarily in the direction of arrows 28 and 29 upon the occurrence of a "no go" decision signal or runs continuously. Thereby the sheet which arrives there and has been unsuccessfully read is introduced into a collection space 30 for unsuccessfully read sheets. There they are deposited in a container 31. Thus, the successfully read sheets are transported into a collection space 22 and there are deposited sequentially in a container 32 and the unsuccessfully read sheets are deposited also in sequence and collected in a container 31 positioned within collection space 30.

This makes it possible to withdraw all the successfully read sheets from the container 32 and all the defectively read sheets from container 31 and to supply the latter, for example for reprocessing, e.g. individual processing.

A particular advantage of the method described, and of the apparatus described for sheet transport arises from the fact that the temporary introduction of each read sheet into the space 22 makes it possible to keep the distance from the reading location 16 to the additional transport roller pair 21a, 21b exceptionally short. In particular there suffices a fraction of the dimensions, or rather height of the sheets to be read, because a large fraction of the respective sheets temporarily protrudes into collection space 22, even when dealing with a sheet which has not been successfully read.

In this manner, it becomes possible to achieve an exceptionally compact construction for the entire sheet transport apparatus 33, including elements 11a, 11b; 16; 19a, 19b; 20; 21a, 21b; 26 and 27a, 27b.

The equipment described not only exhibits compact construction requiring little space, but is also characterized by simple mechanical construction. This makes it more reliable, easier to service, and in addition, economically producible. Thanks to its very compact construction it is also easily possible, using the apparatus 33 which has been described for sheet transport, to construct a very small automatic reading equipment 1. In addition, this compact construction makes it possible to build the described apparatus 33 for sheet transport as a readily interchangeable component of reading equipment 1. In that case, this readily interchangeable component of reading equipment 1 can be replaced by means of a few manipulations with a similar component which may, for example, be suitable for the reading, i.e. for the passage of endless material, such as news tape.

Figure 2:
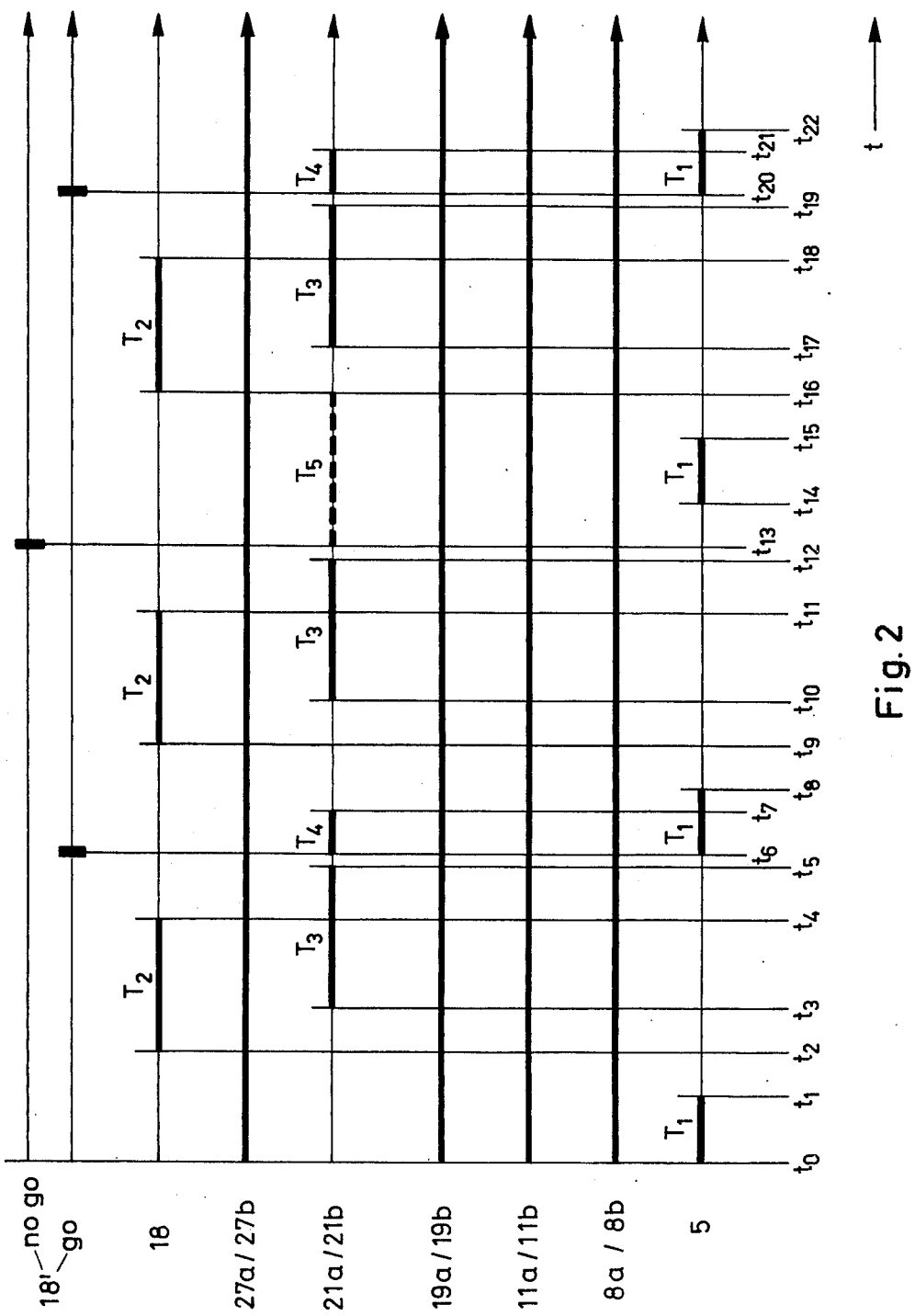
FIG. 2 is a functional diagram.

FIG. 2 shows a functional diagram which provides information about the actuating times and directions of rotation of the various transport rollers, or rather transport roller pairs, in order to achieve the desired series of movements of the sheets to be read. The illustration is not drawn to scale but is intended only to explain the principles of operation.

Each line of FIG. 2 corresponds to a respective roller pair or stripping roller 5 designated to the left of that line (see also FIG. 1). The respective periods of rotation of these are represented by heavy solid or broken lines. The stationary periods are represented by light horizontal lines. Further in FIG. 2 the operating periods of photoelectric receiving means 18' are represented by heavy solid lines, and the go and no-go output signals of utilization means 18' are represented by short transverse lines. The passage of time t is from left to right in FIG. 2, the individual points in time are consecutively designated as $t_0$, $t_1$ ... $t_{22}$ and the time periods as $T_1$ ... $T_5$.

As can be seen from FIG. 2 the first transport roller pair 11a, 11b and the output transport roller pair 19a, 19b are actuated continuously during the entire operating time of the reading equipment 1. To simplify the mechanical drive the last transport roller pair 27a, 27b may also be continuously actuated. It is not required that this roller pair be actuated only intermittently during passage of an unsuccessfully read sheet. For that reason a continuous heavy line is shown in FIG. 2 for all of the lines designated 8a/8b; 11a/11b; 19a/19b and 27a/27b.

Between time $t_0$ and time $t_1$ the stipper roller 5 is actuated throughout the time period $T_1$. The time period $T_1$ is made only long enough that a sheet removed from stack 3 is introduced into the first transport roller pair 8a, 8b and its further transport is assumed thereby. Thereafter, i.e. beyond $t_1$ the stripper roller 5 idles until the sheet leaves the roller 5 and then remains stationary until a later point in time $t_6$. This later point in time $t_6$ is so chosen that in the period from $t_1$ to $t_6$ the previously removed sheet has progressed far enough through the reading equipment 1 that the next subsequent sheet does not overlap the preceding one.

During the time period $T_1$ from $t_0$ to $t_1$ the first sheet is removed and subsequently transported past reading location 16.

To simplify the drive mechanism it is not essential that the last transport roller pair 27a, 27b be actuated only intermittently during the passage of an unsuccessfully read sheet. Rather, it can be rotated continuously just like roller pairs 8a, 8b; 11a, 11b; 19a, 19b.

In summary, it will be recognized that the sheet transport apparatus 33 includes a first sheet guide 10 for supplying sheets to be read to a reading location 16 via an input transport roller pair 11a, 11b. This is followed by a curved second sheet guide 20 directed toward an additional transport roller pair 21a, 21b. The additional transport roller pair has a reversible drive as to its direction of rotation. An additional sheet guide 26 cooperates with the additional transport roller pair 21a, 21b to form with the second sheet guide 20 a reversal point directed toward a final transport roller pair 27a, 27b.

It will further be recognized that the additional transport roller pair 21a, 21b cooperates with a collection space 22 for successfully read sheets, while the final transport roller pair 27a, 27b cooperates with a collection space 30 for unsuccessfully read sheets.

As can be seen from the line in FIG. 2 designated by numeral 18, the operation of photoelectric receiving means 18 starts at time $t_2$, shortly after the end of the period $T_1$ of actuation of stripper roller 5 and continues to a later time $t_4$, by which the first sheet has completely passed by the reading location 16. Thus the corresponding time period $T_2$ includes the time required for reading of the first sheet at reading location 16, when the same is transported past the reading location by means of transport roller pairs 8a/8b, 11a/11b, 19a/19b. A short time after beginning of the reading, at time $t_3$, the additional transport roller pair 21a/21b is set in motion in order to introduce the sheet initially partially into the collection space by rotation in the direction of arrows 24, 25. In so doing, this additional transport roller pair 21a/21b is actuated during a time period $T_3$ which extends up to time $t_5$ and which is so proportioned that the sheet extends partially into collection space 22 at time $t_5$, but is still held at its end portion by roller pair 21a/21b, the trailing edge of the sheet having passed tip 21a which functions as a switching point.

Immediately after time $t_5$ the output from utilization means 18' is available at time $t_6$. Let it now be assumed that the sheet has been correctly read and that therefore a "go" decision signal is present, as shown for time $t_6$ in the second line of FIG. 2. Based on this "go" decision signal, the additional transport roller pair 21a/21b is again set into motion, and specifically in the same direction of rotation of arrows 24, 25 and until time $t_7$ during a relatively short time period $T_4$, sufficient to deposit the sheet completely in the collection space.

At time $t_6$, stripper roller 5 is again actuated in order to transport the next sheet to the reading location. From this time $t_6$ forward until time $t_{12}$ there are repeated the same steps which took place between times $t_0$ and $t_5$. Thus the times $t_8$ to $t_{12}$ correspond to the previously mentioned times $t_1$ to $t_5$ and the same time periods $T_1$, $T_2$ and $T_3$ again apply.

Let it now be assumed that at time $t_{13}$, at which correspondingly to time $t_6$ the decision signal from utilization means 18' is available, this signal constitutes a "no go" decision signal, as represented on the first line of FIG. 2. This means that the second sheet was not successfully read at reading location 16. Due to this signal the additional transport roller pair 21a/21b is set into motion at time $t_{13}$ with reversed rotational direction corresponding to arrows 24', 25'. Accordingly, the second sheet which was first introduced partially into collection space 22, is transported in opposite transport direction via tip 20a and additional sheet guide 26 toward the last transport roller pair 27a/27b and is delivered by this continuously rotating roller pair into the collection space 30 for unsuccessfully read sheets. The time period $T_5$ from time $t_{13}$ to time $t_{16}$ is so chosen that at time $t_{16}$ the sheet has reliably left the additional transport roller pair 21a/21b and is being transported by the last transport roller pair 27a/27b.

The retrograde transport of the sheet by additional transport roller pair 21a/21b into the additional sheet guide 26 requires a longer interval than the deposition of the sheet in collection space 22. Therefore, in case of unsuccessful reading, the renewed actuation of stripper roller 5 to remove an additional sheet is delayed relative to the time of occurrence of the decision signal from utilization means 18'. Consequently, stripper roller 5 is actuated only at a later time $t_{14}$ and not at time $t_{13}$, so that the unsuccessfully read sheet has had its trailing edge pass tip 20a in the direction of collection space 30 before the next read sheet reaches tip 20a via sheet guide 20. From time $t_{14}$ on until time $t_{19}$ the steps correspond to those between times $t_0$ and $t_5$, or $t_6$ and $t_{12}$ with corresponding time periods $T_1$, $T_2$ and $T_3$. In the embodiment illustrated it is further assumed that a "go" decision signal from utilization means 18' is available at time $t_{20}$ as well as at time $t_6$. Therefore beginning with this time $t_{20}$ there is, on the one hand, transported into collection space 22 the previously read sheet (additional transport roller pair 21a/21b is set into motion during time period $T_4$ in the direction of rotation of arrows 24, 25) and the next subsequent sheet is taken off stack 3 (stripper roller 5 being set into motion during time period $T_1$).

In what follows there is described with reference to FIG. 3 a diagramatically illustrated embodiment of the drive mechanism with control apparatus for the various transport roller pairs and the stripper roller 5.

According to FIG. 3 the stripper roller 5 and the transport rollers 8b, 11b, 19b, 21b and 27a are each provided with a drive shaft 35. The second transport rollers 8a, 11a, 19a, 21a and 27b forming part of the respective transport roller pairs are not illustrated in FIG. 3 because they are not motor driven but are mounted on corresponding shafts for free rotation and are set into rotary motion through friction by the driven transport rollers 8b, 11b, 19b, 21b and 27a. To drive shaft 35 of stripper roller 5 there is attached one element 36 of an electrically or electromagnetically actuatable coupling or clutch, whose other element 37 is attached to a rotatable shaft stub 38. The drive shafts 35 of the transport roller pairs and the shaft stub 38 of coupling element 37 are provided at their respective ends with sheaves 39 for flat drive belts 40, 41, 42 and 43. The flat drive belts 40, 41 and 42 are driven by means of additional sheaves 44 in common by a first electric motor 45. The flat drive belt 43 is driven by means of an additional sheave 44 by a second electric motor 46 whose direction of rotation is reversible. In the arrangement of the transport roller pairs shown in FIG. 1 a common flat drive belt can be used to drive the transport rollers 11b, 19b and 27a, as is also embodied in FIG. 3 by means of flat drive belt 40. On the other hand, for transport roller 8b, the additional flat drive belt 41 is provided. As previously mentioned, the transport rollers 8b, 11b, 19b and 27a are actuated continuously and in the same direction of rotation, namely by means of electric motor 45. As can be seen from FIG. 3 the coupling element 37 is also driven by electric motor 45 through flat drive belt 42 continuously and in the same direction of rotation. The coupling element 36 which is connected for rotation together with drive shaft 35 and stripper roller 5 is actuated only when coupling 36, 37 is actuated, that is supplied with an energizing current by means of connection 47.

A control unit 48 supplies during operation the supply voltages, or currents, for electric motor 45, coupling 36, 37, electric motor 46 and receiving means 18 at the times shown in the functional diagram of FIG. 2. More specifically, electric motor 45 is continuously supplied via a connection 49 and coupling 36, 37 is supplied via connection 47 at times $t_0$, $t_6$, $t_{14}$, $t_{20}$ of FIG. 2, respectively during the time period $T_1$. Electric motor 46 is supplied from control unit 48 via a first connection 50 with a current for the forward rotation corresponding to arrow 25 of transport roller 21b in FIG. 1 at times $t_3$, $t_{10}$ and $t_{17}$, and at times $t_6$ and $t_{20}$, respectively, during the time periods $T_3$ and $T_4$. The same motor 46 is supplied by the control unit 48 via a second connection 51 at time $t_{13}$ during the time period $T_5$ with a current for the reverse direction corresponding to arrow 25'. In addition the control unit 48 provides a control signal to receiving means 18 of FIG. 1 which actuates same when a sheet to be read is being transported past reading location 16. Finally, control unit 48 is connected by means of two additional connections with the outputs shown in FIG. 1 of the utilization means for the "go" decision signal and the "no go" decision signal.

The construction of control unit 48 requires no further explanation because it can be provided readily, e.g. by means of known electronic elements. In particular, as appears from the functional diagram of FIG. 2, the "go" decision signal of utilization means 18' can produce energization of the electric motor 46 and also energize coupling 36/37 via connection 47. Similarly, a "no go" decision signal from utilization means 18' can energize electric motor 46 via connection 51 and can also energize, via a delay means (not shown) coupling 36/37 via connection 47 at time $t_{14}$. Additional delay means (not shown) can produce via connection 52 at times $t_2$, $t_9$, $t_{16}$ control of receiving means 18 as well as energization via connection 50 at times $t_3$, $t_{10}$, $t_{16}$ of electric motor 46. The time periods $T_1$ to $T_5$ can be determined by timing circuits, as for example, monostable multivibrators.

Moreover, it is also possible to provide sheet guides 10, 20 and 26 selectively with photoelectric arrangements which determine the beginning and/or the end of the sheet being transported therethrough and which supply the appropriate control signals to control unit 48.

We claim:
1. A method for sheet transport in an automatic reading equipment in which individual sheets to be read are removed from a stack, transported to a reading position and thereafter transported away from said position, comprising:
   introducing a sheet transported away from the reading position initially only partially into a first collection space for successfully read sheets,
   introducing the partially introduced sheet completely into said collection space upon occurrence of a "go" decision from the reading,
   again withdrawing the partially introduced sheet from the collection space for successfully read sheets by an oppositely directed movement upon occurrence of a "no go" decision, and
   supplying the withdrawn sheet to a second collection space for unsuccessfully read sheets.

2. Apparatus for sheet transport in an automatic reading equipment which includes means for removing individual sheets to be read from a stack, means for transporting the individual sheets to a reading position and means for thereafter transporting the sheets away from said position, said apparatus comprising:
   means for introducing a sheet transported away from the reading position initially only partially into a first collection space for successfully read sheets,
   means for introducing the partially introduced sheet completely into said first collection space upon occurrence of a "go" decision from the reading,
   means for again withdrawing the partially introduced sheet from the first collection space for successfully read sheets by an oppositely directed movement upon occurrence of a "no go" decision, and
   means for supplying the withdrawn sheet to a separate collection space for unsuccessfully read sheets.

3. The apparatus of claim 2 including a container for a stack of sheets to be read and sheet transport and guidance means for the supply of individual sheets to be read to a reading position, and comprising
   a transport roller pair positioned at the output of the reading position,
   a first sheet guide means and first reversible transport roller pair positioned ahead of the first collection space for successfully read sheets,
   a second sheet guide means and a second transport roller pair positioned between the reversible transport roller pair and the second collection space for unsuccessfully read sheets, and
   means responsive to the "go" or "no go" decision from the reading to control the direction of rotation of the reversible transport roller pair positioned ahead of the first collection space in such manner that a sheet leaving the reading position is partially introduced into the first collection space due to rotation in one direction of the reversible transport roller pairs, and that in response to a "go" decision the partially introduced sheet is then completely introduced into the first collection space through continued rotation in the same direction of the reversible transport roller pair, whereas in response to a "no go" decision, the partially introduced sheet is supplied to the second collection space via the second sheet guide means and the second transport roller pair due to rotation of the reversible transport roller pair in the opposite direction.

4. The system of claim 3 wherein
   the first sheet guide means and the second sheet guide means have the configuration of a reversal point whose tip is so positioned that a sheet removed in reverse by the reversible transport roller pair is precluded from reentering the first sheet guide means.

5. The system of claims 3 or 4 wherein
   the sheet transport means positioned ahead of the reading position, the transport roller pair at the output of the reading position, and the second transport roller pair at the inlet to the second collection space are rotated continuously in the same direction of rotation.

* * * * *